United States Patent [19]
Baik et al.

[11] Patent Number: 5,329,500
[45] Date of Patent: Jul. 12, 1994

[54] VIDEO CASSETTE RECORDER HAVING AUTOMATIC TIME SETTING FUNCTION

[75] Inventors: Bok H. Baik, Kyungki; Jung H. Hur, Seoul; Dae S. Shim, Inchun, all of Rep. of Korea

[73] Assignee: Goldstar Co., Ltd., Seoul, Rep. of Korea

[21] Appl. No.: 119,579

[22] Filed: Sep. 13, 1993

[30] Foreign Application Priority Data

Feb. 18, 1993 [KR] Rep. of Korea ................. 2244/1993

[51] Int. Cl.$^5$ ............................................. G04B 47/00
[52] U.S. Cl. .......................................... 368/10; 368/47
[58] Field of Search ................................ 368/10, 46–52

[56] References Cited
U.S. PATENT DOCUMENTS 4,569,598 2/1986 Jacobs ..................................... 368/47
4,582,434 4/1986 Plangger et al. ...................... 368/46
4,860,268 8/1989 Allgaier et al. .

Primary Examiner—Bernard Roskoski
Attorney, Agent, or Firm—Finnegan, Henderson Farabow, Garrett & Dunner

[57] ABSTRACT

In a VCR having an automatic time setting function, a receiving circuit receives a current time signal from a broadcasting station, and a wave-shaping circuit converts the current time signal from the receiving circuit to a digital signal. A decoder decodes the digital current time data from the wave-shaping circuit, and a memory stores the decoded current time data from the decoder in frame units. A frame detector detects a starting point of each frame of the current time data from the wave-shaping circuit and resets the current time data of a frame previously stored in the memory upon detecting the starting point. A tuner tunes audio and video signals from the broadcasting station to a reference frequency, and a control unit controls the operation of the VCR and converts the current time data to the current time. An on-screen display unit superimposes a timer signal or the current time on the video signal under the control of the control unit and outputs the resultant signal to an external display unit. A character display unit displays the current time from the control unit, and a key matrix unit applies either a summer time display function signal or a time siren function signal to the control unit according to a user's selection.

10 Claims, 4 Drawing Sheets

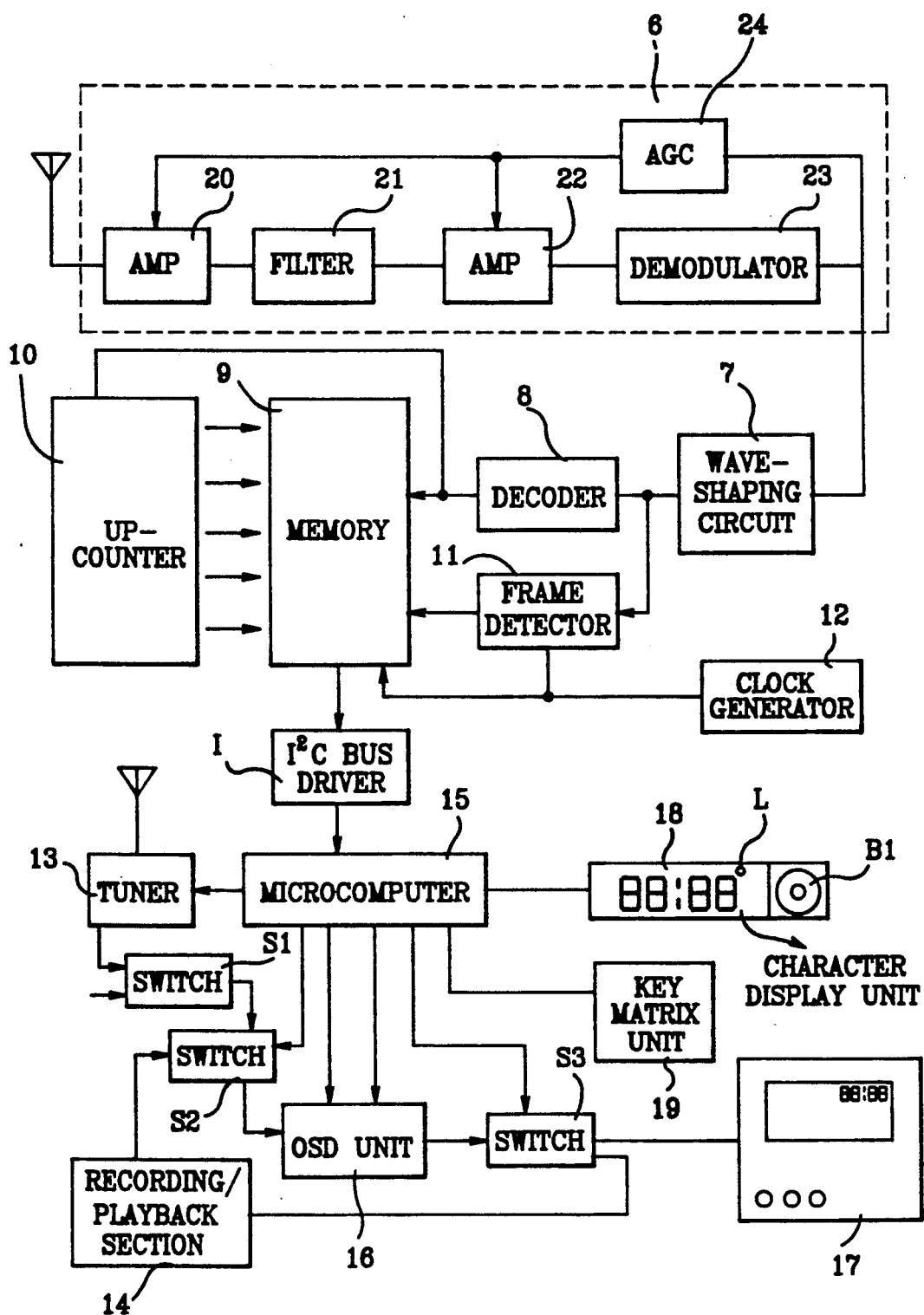
F I G.2

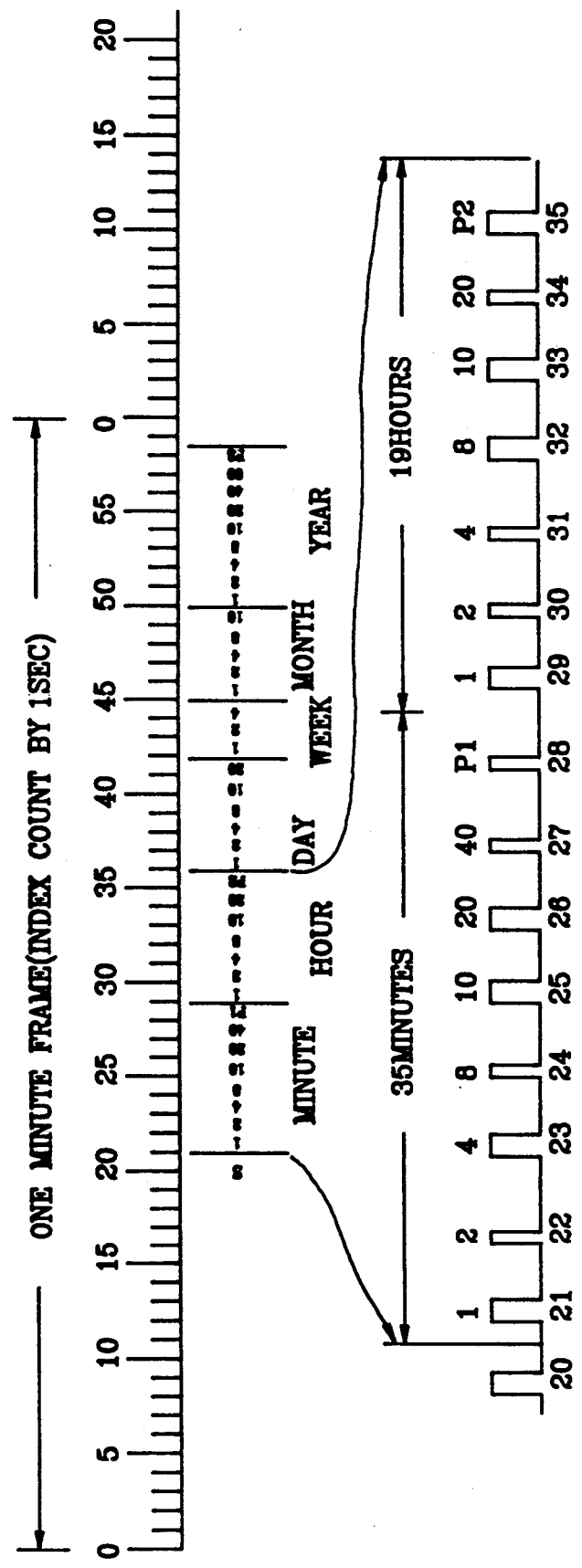

VIDEO CASSETTE RECORDER HAVING AUTOMATIC TIME SETTING FUNCTION

BACKGROUND OF THE INVENTION

1. Field of the Invention

The present invention relates in general to video cassette recorders for receiving current time data transmitted from a broadcasting station and displaying the received data, and more particularly to a video cassette recorder (VCR) having an automatic time setting function, which is capable of displaying the current time data including the hours, minutes and seconds transmitted by the broadcasting station.

2. Description of the Prior Art

Many studies of time display apparatus have been made by watch manufacturing companies. One example of them is disclosed in U.S. Pat. No. 4860268, assigned to Junghance CO., Ltd., Germany, and is shown in FIG. 1, herein. In this patent, the time display apparatus contains a receiving circuit for receiving current time data which is placed on an amplitude modulation (AM) frequency and corrects the current time of a watch section by decoding the received current time data.

As shown in FIG. 1, the conventional time display apparatus comprises an amplifying and demodulating circuit 3 for receiving, through a receiving antenna 2, current time data which is AM-modulated in a broadcasting station and transmitted through a transmitting antenna 1. The circuit 3 amplifiers and demodulates the received current time data, and a time equalizing processor 4 compares the current time from the amplifying and demodulating circuit 3 with the current time displayed on a watch section 5 and corrects the current time on the watch section 5 in accordance with the compared result.

To correct the current time, broadcasting stations for transmitting the AM frequency of a low frequency band have been established in countries such as U.S.A., Germany. Also, watch products which contain the current time data receiving circuit and correct the current time of the watch section by decoding the received current time data are available from the watch manufacturing companies such as, for example, Junghance CO., Ltd., Germany.

However, the watch products available from Junghance CO., Ltd. and the time display apparatus in the above patent operate only to correct a faulty operation or a time error of the mechanical watch section. In particular, the time equalizing processor merely functions to decode the current time data, detect the current time of the watch section, and correct the current time of the watch section as a result of the comparison of the decoded current time data and the detected current time. Also, the current time data contains only hour and minute information without the second information. Further, the time equalization processor 4 continues to receive and process the current time data and subjected to an overload.

SUMMARY OF THE INVENTION

Therefore, the present invention has been made in view of the above problems, and it is an object of the present invention to provide a VCR having an automatic time setting function, which is capable of receiving current time data through a receiving antenna, displaying hours, minutes and seconds of the received current time data and performing the displaying operation only when the displaying operation is required by the user to reduce a load on a microcomputer.

In accordance with the present invention, the above and other objects can be accomplished by a provision of a VCR having an automatic time setting function, comprising: receiving means for receiving a current time signal of radio wave from a broadcasting station and demodulating the received current time signal; wave-shaping means for converting the demodulated current time signal from the receiving means into a digital signal and outputting the resultant current time data; decoding means for decoding the digital current time data from the wave-shaping means; memory means for storing the decoded current time data from the decoding means in a unit frame; frame detecting means for detecting a start point of each frame of the current time data from the wave-shaping means and resetting the current time data of one frame previously stored in the memory means upon detection of the start point; tuning means for receiving audio and video signals of radio wave from the broadcasting station and tuning the received audio and video signals to a reference frequency; control means for controlling the operation of the VCR, analyzing the current time data read from the memory means and converting the current time data into the current time in accordance with the analyzed result; on-screen display means for super imposing one of a timer signal and the current time on the video signal from the tuning means under the control of the control means and outputting the resultant signal to external display means; character display means for displaying the current time from the control means; and key matrix means for applying one of a summer time display function signal and a time siren function signal to the control means according to a user's selection.

BRIEF DESCRIPTION OF THE DRAWINGS

The above and other objects, features and advantages of the present invention will be more clearly understood from the following detailed description taken in conjunction with the accompanying drawings, in which:

FIG. 2 is a detailed block diagram of a VCR having an automatic time setting function in accordance with an embodiment of the present invention;

FIG. 4 is a view illustrating a time code format in accordance with the present invention.

DETAILED DESCRIPTION OF THE PREFERRED EMBODIMENTS

Figure 1:
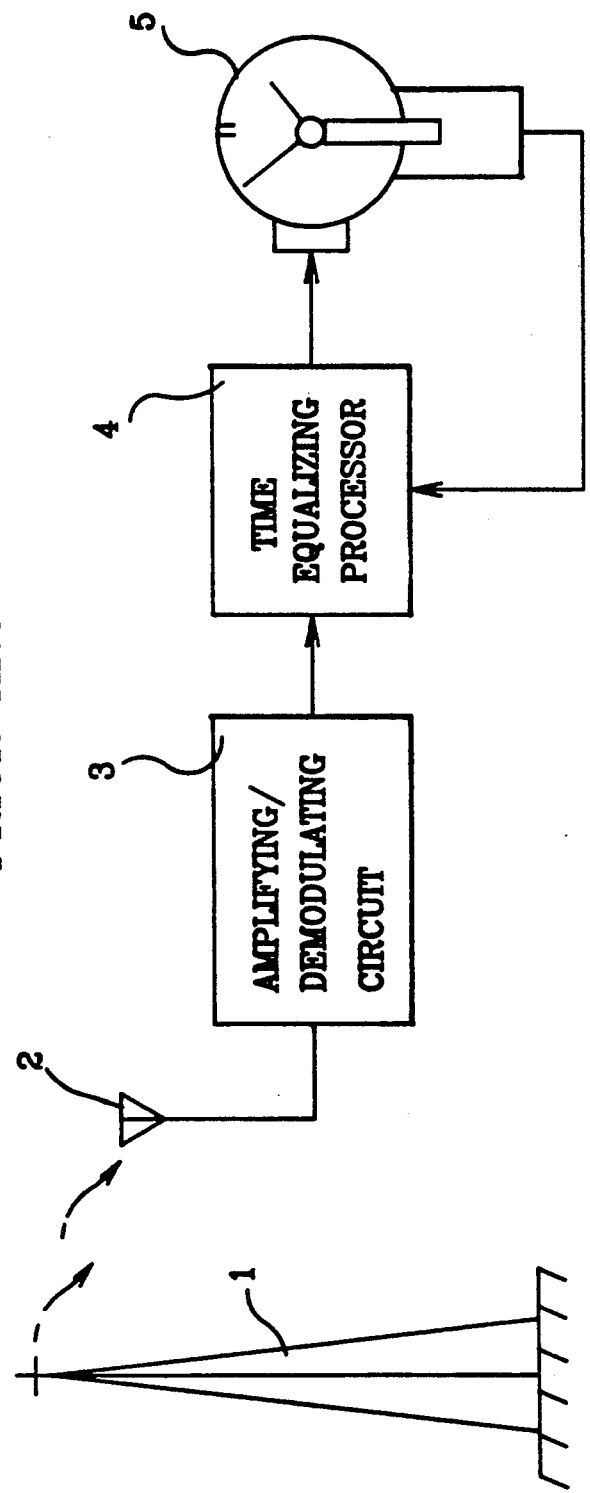
FIG. 1 is a schematic block diagram of a conventional time display apparatus.

Referring to FIG. 2, a detailed block diagram of a VCR is shown having an automatic time setting function in accordance with an embodiment of the present invention. As shown in this drawing, the VCR includes a receiving circuit 6 for receiving a current time signal of radio wave from a broadcasting station, amplifying the received current time signal and demodulating the amplified current time signal, a wave-shaping circuit 7 for converting the demodulated current time signal from the receiving circuit 6 into a digital signal and outputting the resultant current time data, a decoder 8 for decoding the digital current time data from the wave-shaping circuit 6, an up-counter 10 for up-counting the digital current time data from the wave-shaping circuit 6 in the unit of second and outputting the resultant second data, and a memory 9 for storing the decoded current time data of a unit frame from the decoder 8 and the second data from the up-counter 10.

The VCR also includes a frame detector 11 for detecting a start point of each frame of the current time data from the wave-shaping circuit 6 and resetting the current time data of one frame and the second data previously stored in the memory 9 upon detection of the start point, a clock generator 12 for generating a clock for the memory 9 and the frame detector 11, a tuner 13 for receiving audio and video signals of radio wave from the broadcasting station and tuning the received audio and video signals to a reference frequency, a recording/playback section 14 for recording and playing back the audio and video signals and the current time signal from the broadcasting station, and a microcomputer 15 for controlling the whole operation of the VCR, analyzing the current time data read from the memory 9 and converting the current time data into the current time in accordance with the analyzed result.

The microcomputer 15 is adapted to transmit the reference frequency corresponding to a channel selected by the user as data to the tuner 13; select any one of an output signal from the tuner 13, an output signal from the recording/playback section 14 and an external video signal; receive the current time data of one frame and the second data from the memory 9 through an I²C bus driver I; check presence of errors in the received data according to parity bits; and convert the received data into the current time when the received data are normal as a result of the checking.

Also, the VCR includes an on-screen display (OSD) unit 16 for super imposing a timer signal or the current time on the video signal from the tuner 13 under the control of the microcomputer 15 and outputting the resultant signal to the recording/playback section 14, a light emitting indicator L for indicating summer time when the current time from the microcomputer 15 is the summer time, a character display unit 18 for displaying the current time from the microcomputer 15, a key matrix unit 19 for applying a summer time display function signal or a time siren function signal to the microcomputer 15 according to a user's selection, a buzzer B1 for generating a time siren when the time siren function is selected by the user, a switch S1 for selecting one of the video signal from the tuner 13 and the external video signal under the control of the microcomputer 15, a switch S2 for selecting one of an output signal from the switch S1 and the output signal from the recording/playback section 14 under the control of the microcomputer 15, and a switch S3 for outputting an output signal from the OSD unit 16 to the recording/playback section 14 under the control of the microcomputer 15. The switch S3 also functions to output the super imposed current time from the OSD unit 16 to a television (TV) set 17, which processes and displays the received super-imposed current time.

In accordance with the embodiment of the present invention, the receiving circuit 6 includes an amplifier 20 for receiving the current time signal of radio wave from the broadcasting station through a receiving antenna and amplifying the received current time signal, a filter 21 for filtering an output signal from the amplifier 20, an amplifier 22 for amplifying an output signal from the filter 21, a demodulator 23 for demodulating an output signal from the amplifier 22, and an automatic gain controller (AGC) 24 for lowering amplification degrees of the amplifiers 20 and 22 when intensities of electric fields to the amplifiers 20 and 22 are strong and raising the amplification degrees when the intensities of the electric fields are weak, so that the current time signal can be maintained at a fixed level.

Figure 3:
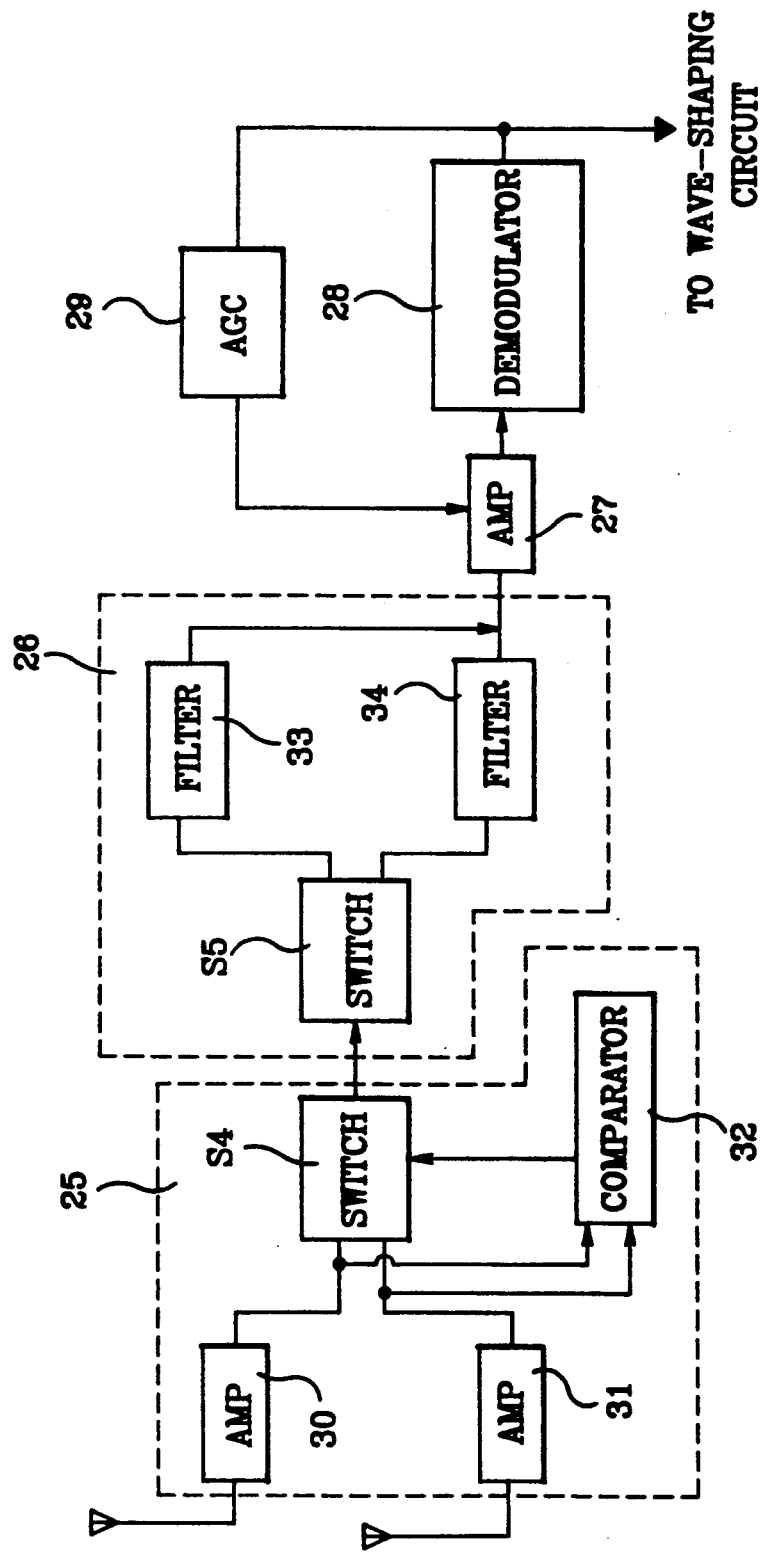
FIG. 3 is a detailed block diagram of a receiving circuit in the VCR of FIG. 2 in accordance with an alternative embodiment of the present invention.

In accordance with an alternative embodiment of the present invention, as shown in FIG. 3, the receiving circuit 6 includes a reception sensitivity selecting circuit 25 for receiving the current time signal of radio wave from the broadcasting station from different receiving directions and selecting the current time signal of a better reception sensitivity, a frequency selecting circuit 26 for selecting a frequency convenient for reception when the VCR is placed at a center position between two broadcasting station regions of different transmitting frequencies for the current time signal, an amplifier 27 for amplifying an output signal from the frequency selecting circuit 26, a demodulator 28 for demodulating an output signal from the amplifier 27, and an automatic gain controller 29 for lowering an amplification degree of the amplifier 28 when an intensity of an electric field to the amplifier 28 is strong and raising the amplification degree when the intensity of the electric field is weak, so that the current time signal can be maintained at a fixed level.

The reception sensitivity selecting circuit 25 includes an amplifier 30 for receiving the current time signal of radio wave from the broadcasting station through a receiving antenna and amplifying the received current time signal, an amplifier 31 for receiving the current time signal of radio wave from the broadcasting station through another receiving antenna of a receiving direction different from that of the amplifier 30 and amplifying the received current time signal, a switch S4 for selecting one of output signals from the amplifiers 30 and 31, and a comparator 32 for comparing the output signals from the amplifiers 30 and 31 to select the one having the better reception sensitivity and controlling the switch S4 in accordance with the compared result.

The frequency selecting circuit 26 includes a filter 33 for performing a filtering operation at the transmitting frequency of one of the broadcasting station regions, a filter 34 for performing a filtering operation at the transmitting frequency of the other of the broadcasting station regions, and a switch S5 for selecting one of the filters 33 and 34.

The operation of the VCR with the above-mentioned construction in accordance with the first embodiment of the present invention will hereinafter be described in detail with reference to FIG. 2.

The current time signal, which is AM-modulated in the broadcasting station and transmitted through a transmitting antenna, is received through the receiving antenna by the amplifier 20, which amplifies the received current time signal and outputs the amplified current time signal to the filter 21. The current time signal filtered by the filter 21 is again amplified by the amplifier 22 and then demodulated by the demodulator 23.

The demodulated current time signal from the demodulator 23 is wave-shaped into the digital current time signal by the wave-shaping circuit 7. The decoder 8 decodes the digital current time data into logic data of 0 or 1 by checking its duty cycle. The decoded current time data from the decoder 8 is stored in bit units and in frame units in the memory 9.

Upon application of a transmission request signal through the I²C bus driver I from the microcomputer 15, the current time data of one frame and the second data are transmitted from the memory 9 to the microcomputer 15.

FIG. 4 illustrates a time code format in accordance with the present invention. In the time code format of the current time data stored in a frame in the memory 9, a one minute frame consists of 59 digit time slots, each decoded into 0 or 1 by the decoder 8. Also, the one minute frame contains various information. The microcomputer 15 recognizes the information by checking the order (positions) of bits of the one minute frame designating the information. Namely, as shown in FIG. 4, the 21th to 58th bits of the one minute frame designate minutes, an hours, date, day, week, month, year, and start and parity information, respectively. The 18th bit thereof designates the summer time.

The current time data with the above code format is stored in the frame units in the memory 9. At this time, upon application of no transmission request signal through the I²C bus driver I from the microcomputer 15 to the memory 9, the frame detector 11 detects whether the current time data of the next frame is to be transmitted to the memory 9. If it is detected that the current time data of the next frame is to be transmitted to the memory 9, the frame detector 11 resets the current time data of one frame stored in the memory 9 so that the current time data of the next frame can be stored in the memory 9.

However, there is no second data in the current time data of one frame, as shown in FIG. 4. For this reason, the up-counter 10 is adapted to receive the current time data from the wave-shaping circuit 7 in the unit of bits and up-count the received current time data in the unit of seconds. Then, the up-counter 10 applies the count or the seconds data to the memory 9. As a result, the seconds data is stored together with the current time data of one frame in the memory 9. Similarly, the seconds data stored in the memory 9 is reset in the unit of minutes by the frame detector 11.

The microcomputer 15 receives the current time data of one frame and the seconds data from the memory 9 through the I²C bus driver I by applying the transmission request signal to the memory 9. Upon receiving the current time data from the memory 9, the microcomputer 15 checks the order of the bits of the current time data and stores BCD (binary coded decimal) values according to a logical 0 or 1 state of each bit in its internal RAM. Here, the 21th–27th bits designate the BCD value of the minutes, the 29th–34th bits designate the BCD value of the hours, the 36th–41th bits designate the BCD value of the day, the 42th–44th bits designate the BCD value of the week, the 45th–49th designate the BCD value of the month, and the 50th–57th bits designate the BCD value of the year. The microcomputer 15 checks the presence of errors in the received data according to the parity bits and converts the received data into the current time when the received data are normal as a result of the checking. Also, the microcomputer 15 recognizes that the current time is summer time, by checking a summer time bit of the current time data.

With the processing of the current time data of one frame, the microcomputer 15 receives the seconds data from the memory 9 and converts the received seconds data into the current time. As mentioned above, the seconds data is generated by the up-counter 10. Namely, the up-counter 10 receives the current time data in the unit of bits and up-counts the received current time data in the unit of seconds. The count or the seconds data from the up-counter 10 is stored in the memory 9 whenever the current time data is up-counted by the up-counter 10. The up-counter 10 is reset by the frame detector 11 when 59th bit in the current time data of one frame is not detected by the frame detector 11. As a result, the up-counter 10 counts the numbers 1–59 or 59 pulses since there are bits designating 0–58 seconds, respectively, and outputs the resultant seconds data.

The current time analyzed by the microcomputer 15 is displayed by the character display unit 18. When the current time from the microcomputer 15 is the summer time, the light emitting indicator L is turned on to inform the user that the current time is the summer time. Also, when the time siren generation is required by the user using the key matrix unit 19, the buzzer B1 is turned on to generate the time siren.

The microcomputer 15 also pre-stores the reference frequencies corresponding to various channels of the broadcasting stations. When a channel is selected by the user, the microcomputer 15 transmits the reference frequency corresponding to the selected channel as data to the tuner 13, thereby causing the tuner 13 to be at a broadcasting receivable state. As a result, the tuner 13 receives the audio and video signals from the corresponding broadcasting station and performs high frequency-amplification and frequency conversion for the received audio and video signals. The recording/playback section 14 records the audio and video signals from the tuner 13 or plays back the recorded audio and video signals.

The output signal from the tuner 13 and the output signal from the recording/playback section 14 can be displayed on the TV set 17 by the switches S1 and S2 under the control of the microcomputer 15. In order to display the current time from the broadcasting station on the TV set 17, the microcomputer 15 applies the current time data and the seconds data to the OSD unit 15, which then outputs the applied data to the TV set 17 through the switch S3. As a result, the current time can be displayed as a caption in the TV set 17.

In order to super impose the current time on the video signal for an initial several seconds of the recording of the video signal in the recording/playback section 14, the OSD unit 16 super imposes the current time on the video signal under the control of the microcomputer 15 and outputs the resultant signal to the recording/playback section 14 through the switch S3 under the control of the microcomputer 15. As a result, the video signal on which the current time is super-imposed is recorded in the recording/playback section 14.

Now, the operation of the VCR in accordance with the second embodiment of the present invention will be described in detail with reference to FIG. 3.

To select a frequency convenient for reception when the VCR is placed at a center position between two broadcasting station regions of different transmitting frequencies for the current time signal, one of the filters 33 and 34 is selected by the switch S5. In the reception sensitivity selecting circuit 25, the amplifiers 30 and 31 receive the current time signal of radio wave from the broadcasting station in different receiving directions and amplifies the received current time signals. The comparator 32 compares the output signals from the amplifiers 30 and 31 to each other to select the one having the better reception sensitivity and controls the switch S4 in accordance with the compared result. As a result, the current time signal of the better reception sensitivity is selected by the switch S4 and then applied to the previously selected one of the filters 33 and 34.

The filtered current time signal is amplified by the amplifier 27, demodulated by the demodulator 28 and then applied to the wave-shaping circuit 7 in FIG. 2.

As hereinbefore described, according to the present invention, the seconds of the received current time data can be displayed in addition to the hours and minutes. This provides the user with a more accurate time. Also, the displaying operation is performed only when the displaying operation is required by the user. Therefore, the microcomputer can operate efficiently because of the reduction in the load. Further, the receiving circuit, the wave-shaping circuit, the decoder, the up-counter, the memory, the frame detector, the clock generator, the character display unit, the key matrix unit and the microcomputer may be provided in a remote controller to set and display the current time. With this construction, the remote controller can provide the user with the current time through itself.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A VCR having an automatic time setting function, comprising:
   receiving means for receiving a current time signal transmitted from a broadcasting station and for demodulating the received current time signal;
   wave-shaping means for converting the demodulated current time signal from said receiving means to a digital signal and for outputting a resultant digital current time data;
   means for decoding the digital current time data from said wave-shaping means;
   means for storing the decoded current time data from said decoding means in frame units;
   frame detecting means for detecting a starting point of each frame of the current time data from said wave-shaping means and for resetting a current time data of a frame previously stored in said storing means upon detection of the starting point;
   tuning means for receiving audio and video signals transmitted from the broadcasting station and for tuning the received audio and video signals to a reference frequency;
   control means for controlling VCR operations, for analyzing the current time data read from said storing means and for converting the current time data to a current time in accordance with an analyzed result;
   on-screen display means for superimposing one of a timer signal and the current time on the video signal from said tuning means under the control of said control means and for outputting a resultant superimposed signal to an external display;
   character display means for displaying the current time from said control means; and
   key matrix means for applying one of a summer time display function signal and a time siren function signal to said control means.

2. A VCR having an automatic time setting function according to claim 1, further comprising means for generating a clock signal to said storing means and said frame detecting means.

3. A VCR having an automatic time setting function according to claim 1, further comprising means for indicating summer time when the current time from said control means is the summer time.

4. A VCR having an automatic time setting function according to claim 1, further comprising means for generating a time siren when a time siren function is selected using said key matrix means.

5. A VCR having an automatic time setting function according to claim 1, wherein said receiving means includes:
   a receiving antenna for receiving the current time signal from the broadcasting station; p1 a first amplifier for amplifying the received current time signal;
   a filter for filtering an output signal from said first amplifier;
   a second amplifier for amplifying an output signal from said filter;
   a demodulator for demodulating an output signal from said second amplifier; and
   an automatic gain controller for automatically controlling gains of said first and second amplifiers.

6. A VCR having an automatic time setting function according to claim 1, wherein said receiving means includes:
   a reception sensitivity selecting circuit for receiving the current time signal from the broadcasting station from different receiving directions and for selecting the current time signal of a better reception sensitivity;
   a frequency selecting circuit for selecting a frequency of better reception between different transmitting frequencies of the current time signal from a plurality of respective broadcasting station regions;
   an amplifier for amplifying an output signal from said frequency selecting circuit;
   a demodulator for demodulating an output signal from said amplifier; and
   an automatic gain controller for automatically controlling a gain of said amplifier.

7. A VCR having an automatic time setting function according to claim 6, wherein said reception sensitivity selecting circuit includes:
   a first receiving antenna for receiving the current time signal from the broadcasting station;
   a second amplifier for amplifying the current time signal received from the first receiving antenna;
   a second receiving antenna for receiving the current time signal from the broadcasting station from a direction different from that of said first receiving antenna;
   a third amplifier for amplifying the current time signal received from the second receiving antenna;
   a switch for selecting one of output signals from said second and third amplifiers; and
   a comparator for comparing the output signals from said second and third amplifiers to select the one of said second and third amplifiers having a better reception sensitivity and for controlling said switch in accordance with the comparison.

8. A VCR having an automatic time setting function according to claim 6, wherein said frequency selecting circuit includes:

a first filter for filtering at a transmitting frequency of one of the plurality of the broadcasting station regions;

a second filter for filtering at a transmitting frequency of another of the plurality of the broadcasting station regions; and a switch for selecting one of the first and second filters.

9. A VCR having an automatic time setting function according to claim 1, further comprising:

means for up-counting the digital current time data from said wave-shaping means in units of seconds and for outputting a resultant seconds data to said storing means, said character display means displaying hours, minutes and seconds of the current time from said control means.

10. A VCR having an automatic time setting function according to claim 1, further comprising a TV set for displaying the current time from said on-screen display means.

* * * * *

UNITED STATES PATENT AND TRADEMARK OFFICE
CERTIFICATE OF CORRECTION

PATENT NO. : 5,329,500
DATED : July 12, 1994
INVENTOR(S) : Bok Hyun BAIK et al

It is certified that error appears in the above-indentified patent and that said Letters Patent is hereby corrected as shown below:

ATTORNEY, AGENT OR FIRM, Front Page, Line 1 after "Henderson" insert --,--.

Claim 1, Column 7, Line 59 delete "the".

Claim 5, Column 8, Line 15 delete "pl a first am-" and begin new line with --a first am-- merging line 16 thereto.

Signed and Sealed this

Twenty-first Day of March, 1995

Attest:

BRUCE LEHMAN

*Attesting Officer*     *Commissioner of Patents and Trademarks*